United States Patent [19]

Belmares-Sarabis et al.

[11] Patent Number: 5,305,094
[45] Date of Patent: Apr. 19, 1994

[54] DIGITAL VIDEO SIGNAL COLOR DETECTOR, CORRECTOR AND METHOD

[75] Inventors: Armand Belmares-Sarabis, Catskill, N.Y.; Stanley J. Chayka, Parsippany, N.J.

[73] Assignee: Inprop, Inc., Morris Plains, N.J.

[21] Appl. No.: 887,235

[22] Filed: May 19, 1992

Related U.S. Application Data

[63] Continuation of Ser. No. 815,892, Dec. 30, 1991, which is a continuation of Ser. No. 502,057, Mar. 30, 1990.

[51] Int. Cl.$^5$ ............................................. H04N 9/64
[52] U.S. Cl. ..................................... 348/651; 348/646
[58] Field of Search .................. 358/27, 28, 32, 76, 358/80, 168, 17, 10, 19, 148; H04N 9/64

[56] References Cited

U.S. PATENT DOCUMENTS

| | | | |
|---|---|---|---|
| 3,893,166 | 7/1975 | Pugsley | 358/80 |
| 4,096,523 | 6/1978 | Belmares-Sarabia et al. | 358/80 |
| 4,364,084 | 12/1982 | Akimoto et al. | 358/76 |
| 4,410,908 | 10/1983 | Belmares-Sarabia et al. | |
| 4,597,006 | 6/1986 | Osburn | 358/80 |
| 4,602,277 | 7/1986 | Guichard | 358/27 |
| 4,642,682 | 2/1987 | Orsburn et al. | |
| 4,710,800 | 12/1987 | Fearing et al. | |
| 4,727,412 | 2/1988 | Fearing et al. | |
| 4,733,295 | 3/1988 | Hemsky et al. | |
| 4,763,186 | 8/1988 | Belmares-Sarabia et al. | |
| 4,764,717 | 8/1988 | Tucker et al. | |
| 4,782,384 | 11/1988 | Tucker et al. | |
| 4,839,718 | 6/1989 | Hemsky et al. | |
| 4,862,251 | 8/1989 | Belmares-Sarabia et al. | |
| 4,866,511 | 9/1989 | Belmares-Sarabia et al. | 358/27 |
| 4,876,589 | 10/1989 | Orsburn et al. | |
| 4,876,589 | 10/1989 | Orsburn et al. | |
| 4,954,883 | 9/1990 | Belmares-Sarabia et al. | |
| 5,089,882 | 2/1992 | Kaye et al. | 358/28 |

Primary Examiner—James J. Groody
Assistant Examiner—Glenton B. Burgess
Attorney, Agent, or Firm—Gregor N. Naff

[57] ABSTRACT

The color balance, hue, saturation, luminance, and other parameters of digital video signals are corrected entirely in the digital domain. Correction signals are combined with the digital video signals and new digital video signals are created to replace the original signals. Thus, color correction is performed without victorial addition or similar techniques. A digital "six-vector" color correction circuit, as well as an infinitely variable color selection correction circuit are provided. Also provided is a window for isolating the color corrections, with the capability of limiting the isolation provided by the window to a single selected hue so that one color can be corrected under the restrictions of the window, while others are corrected free of those restrictions. A separate window can be provided simultaneously for each of six colors and the infinitely variable correction circuit. Different corrections of the same color can be made inside and outside of the window. A digital computer is used to generate phase, amplitude and other signals to make corrections corresponding to the settings of adjustment knobs. Preferably, register files are provided for storing multiple different signal levels, with progressive selection being made among the signal levels while traversing the boundary of a window so as to provide a "soft" edge for the window.

26 Claims, 7 Drawing Sheets

DIGITAL VIDEO SIGNAL COLOR DETECTOR, CORRECTOR AND METHOD

This application is a continuation of application Ser. No. 815,892, filed Dec. 30, 1991, which was a continuation of Ser. No. 07/502,057, filed Mar. 30, 1990.

This invention relates to the color correction of video signals, and particularly to the digital color correction of digital and analog video signals.

Modern video color correctors are highly versatile and accurate in separating and correcting various colors in video signal programs. The "Sunburst" color corrector sold by Corporate Communications Consultants, Inc., and shown in U.S. Pat. No. 4,862,251, and others, is an example of such prior art color correction systems and methods.

The color correction processes performed in such equipment are basically analog in nature. Essentially, all analog systems are subject to the problems of electrical noise in the signals, drift, and, under certain circumstances, lack of reliability. Also, there are problems caused by the vectorial combination of analog signals in some prior analog devices. It long has been desired to produce a digital color corrector and method to take advantage of the fact that digital systems are essentially noise-free, free of drift, and highly reliable in operation, and it long has been desired to provide color correction free from the other problems mentioned above.

Although equipment has been offered claiming to perform some color correction procedures digitally, it is not known that anyone has yet provided an operating, full-feature digital color corrector or method.

Accordingly, it is an object of the present invention to provide a digital color corrector which overcomes or alleviates the foregoing problems.

More particularly, it is an object to provide such a color corrector which performs all or substantially all of the sophisticated functions of prior analog equipment, but does so in the digital domain.

Furthermore, it is an object to provide such equipment which is relatively noise-free, highly reliable, and is relatively free of drift.

Still further, it is an object to provide such a color corrector and method which avoid the problems associated with the vectorial combination of analog video signals in the usual analog color correction system and method.

It is another object to the invention to provide such a device and method which is a relatively simple and inexpensive to use.

Another problem with prior color correctors using windows to restrict the areas in which color changes are effective is that such devices prevent the correction of other areas without first disabling the window or moving it. Furthermore, prior windows are restricted in their usefulness.

Therefore, it is yet another object of the invention to provide a video color corrector and method in which windows are provided which do not have the foregoing deficiencies, and which permit greater flexibility and utility in their use.

In accordance with the present invention, the foregoing objects are met by the provision of a color corrector and method in which corrections are made entirely digitally, without the vectorial combination of analog signals. A digital computer is provided to convert color parameter adjustments into digital correction signals which will change the apparent phase and amplitude of the signals in a manner so as to create the desired corrections.

Preferably, separate fixed-range color detectors are provided, each with controls to adjust the hue and/or saturation and/or luminance of signals which fall within that fixed sector of the color spectrum. Advantageously, the fixed sectors correspond to the sectors for the three primary and three secondary colors; that is red, blue, green, yellow, magenta, and cyan. A separate adjustment knob is provided for each of the hue, saturation and luminance parameters for each of the six sectors.

Advantageously, a second color correction circuit is provided in which correction of the hue, saturation and luminance of colors falling within a single relatively narrow band can be accomplished. The position of the band in the color spectrum is essentially infinitely variable. Preferably, the width of the band is variable to a very narrow width.

It also is preferred that digital means is provided for forming one or more windows on a video screen displaying the pictures being corrected. The windows are given "soft" edges or boundaries by storing different signal levels in register files and progressively shifting the signal levels to change colors gradually when forming the boundaries of the windows.

In addition, a color corrector is provided in which it is possible for the operator to select one color out of many for exclusive operation with a window. The group of hues among which a selection can be made advantageously includes the three primary and secondary colors. Moreover, a separate window can be provided for each of those six colors. Together with a separate window for the narrow-band circuit a total of at least seven windows can be formed and used in a given picture.

Advantageously, correction of the selected color can be made inside the window, and a different one outside of the window. All other hues remain unaffected by a window dedicated to one hue, and can be color-corrected simultaneously with the selected color, in all parts of the picture.

The foregoing objects, features and advantages of the invention will be set forth in or apparent from the following description and drawings.

IN THE DRAWINGS

GENERAL DESCRIPTION

Figure 1:
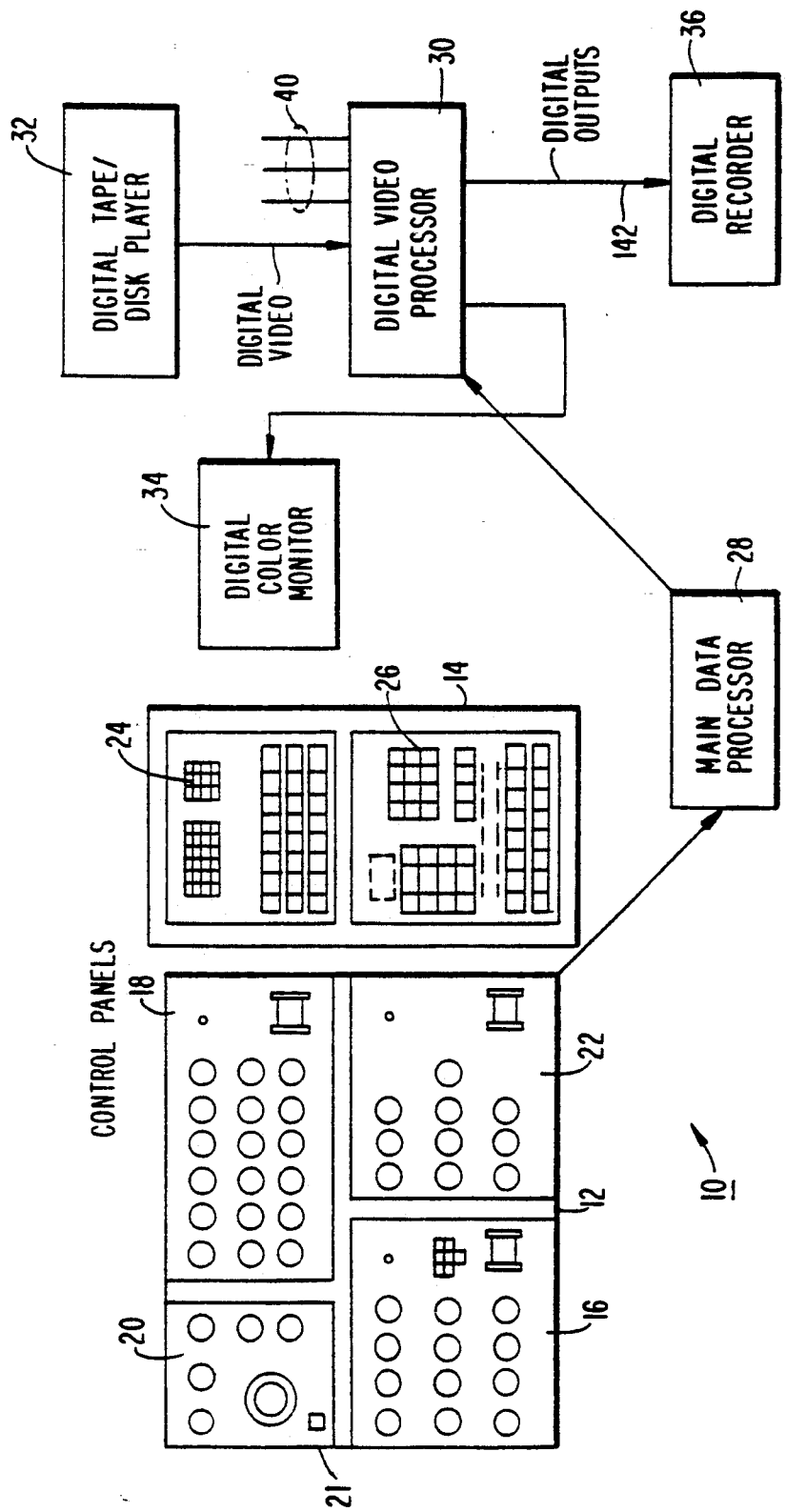
FIG. 1 is a schematic circuit diagram showing a color correction system constructed in accordance with the present invention.

FIG. 1 shows a color correction system 10 which includes control panels 12 and 14, a main data processor 28, and a digital video processor 30. Digital video signals are developed by a digital video tape or disc player 32. The player 32, such as the Sony DVR10 professional recorder-player, converts analog video signals into digital form. Analog-to-digital convertors for the same purpose also are commercially available.

The digital video signals are sent to the digital video processor 30 which performs color correction and produces color-corrected digital output signals corresponding to the input signals. The output signals are recorded on a digital recorder 36. The color corrected pictures are displayed on a "digital" color monitor 34. This monitor is an analog monitor with digital-to-analog converter means.

In use, digital video signals are developed by the player 32. Color corrections are made by use of the control panels 12 and 14, and digitally-corrected color signals are stored in the main data processor 28 for each separate scene or frame in a video program.

Preferably, the player 32 is stopped at or near the beginning of each new scene in the video program so that a frame from that scene is displayed on the digital color monitor 34. The color corrections are made by operation of the controls on the control panels, the connected signals are stored in the main data processor, and the player is started and moved to the next scene where the procedure is repeated.

If desired, any prior correction which has been stored in the main data processor can be recalled and applied to a later scene or frame in essentially the same manner as shown and described in the "Sunburst" U.S. Pat. No. 4,862,251; the "Rainbow" U.S. Pat. No. 4,096,523; the "Call-a-Picture" U.S. Pat. No. 4,763,186 and other prior patents identified in those patents.

After the entire program has been color corrected in this manner, the tape player 32 can be re-wound to its start position, and the entire color corrected program can be recorded by use of the digital recorder 36, with color corrections being recalled from memory in the main data processor 28 upon the detection of the first frame of a new scene, etc., as is well-known in the prior art.

Advantageously, unlike most or all analog recorders, the digital recorder 36 is capable of recording with intermittent motion. Therefore, each scene of the program can be recorded immediately after corrections are complete, without returning the player 32 to its starting position and replaying the input record.

The color-corrected digital output signals can be used at intermediate points in editing systems, and in other systems or equipment in which such signals are used.

CONTROL PANELS

Figure 2:
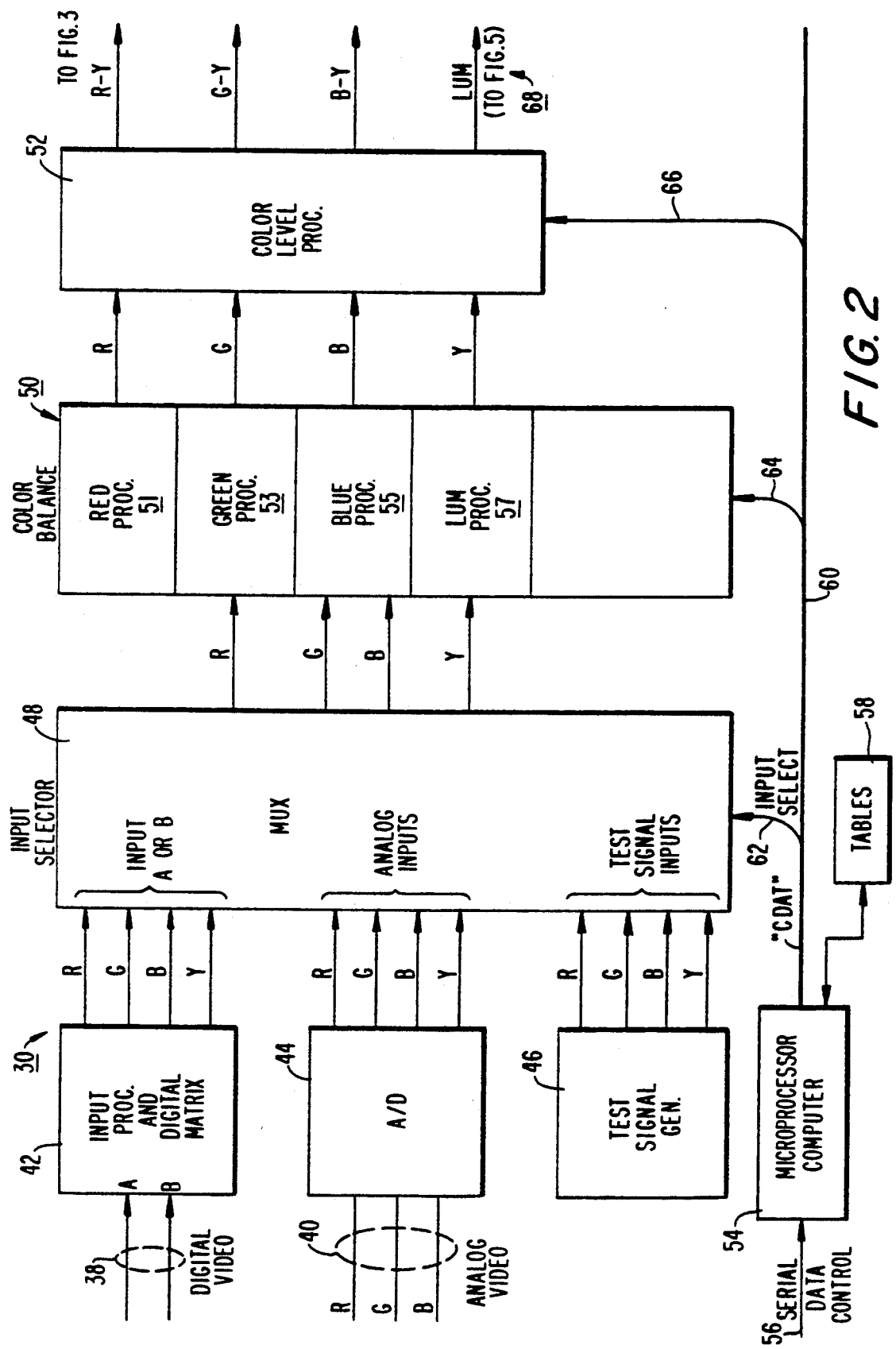
FIGS. 2, 3, 4 and 5 are schematic circuit diagrams of the digital video processor of the system shown in FIG. 1.

The control panels 12 and 14 have essentially the same controls as shown in FIG. 2 of the drawings of the Sunburst U.S. Pat. No. 4,862,251.

The controls include a group 16 of color balance controls including rotary adjustment knobs for gain, gamma and pedestal for red, green, blue and luminance. Preferably, each of the controls is a rotary shaft-position encoder device which provides a digital output indication of its movement.

The section 18 includes 18 rotary controls; six each for hue saturation and luminance for yellow, green, cyan, blue, magenta and red, the primary and secondary or complementary colors.

The controls 20 include a variable-vector selector control 21 for selecting a narrow band of the color spectrum in which to detect colors, and other controls for setting the width of the band, and setting the saturation level of signals detected in the band, as well as knobs for adjusting the hue, saturation and luminance of the colors detected.

The controls 22 include a variety of further controls, as further explained in the Sunburst patent.

Figure 3:
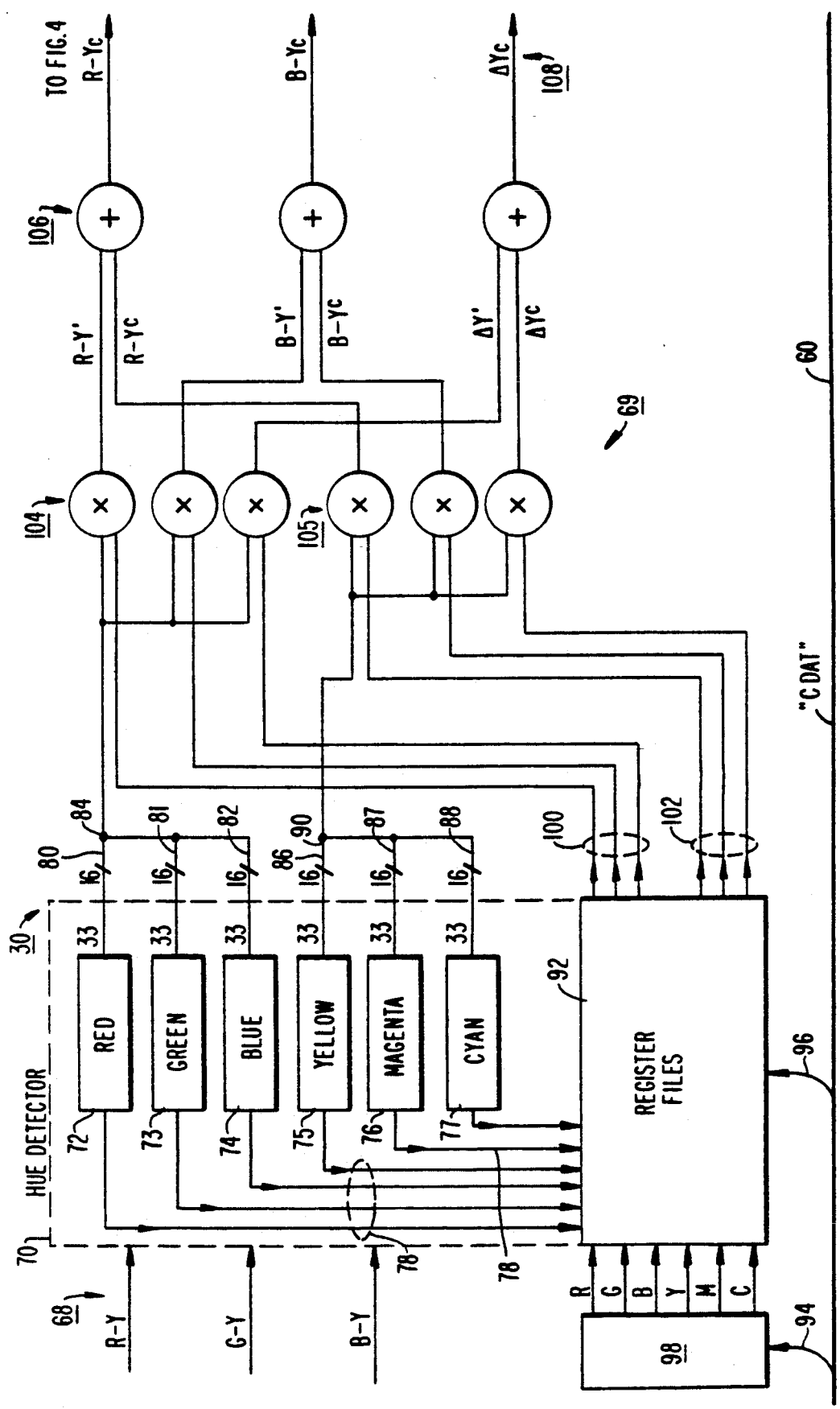

The controls in the lower portion 26 of panel 14 include all of the functions as shown in FIG. 3 in the Sunburst patent, as well as controls for the "Interweave" function of U.S. patent application Ser. No. 257,647 filed Oct. 14, 1988, Now U.S. Pat. No. 4,954,883, and the "Call-A-Picture" function shown in U.S. Pat. No. 4,763,186 which enable the operator to select color corrections from a prior corrected scene by choosing the scene from a display of miniature images of prior scenes on a supplemental monitor (not shown).

The panel sections 24 and 26 also include the usual controls for starting and stopping the video signal source, storing data, etc., as set forth in the Sunburst patent.

DIGITAL VIDEO PROCESSOR

Figure 4:
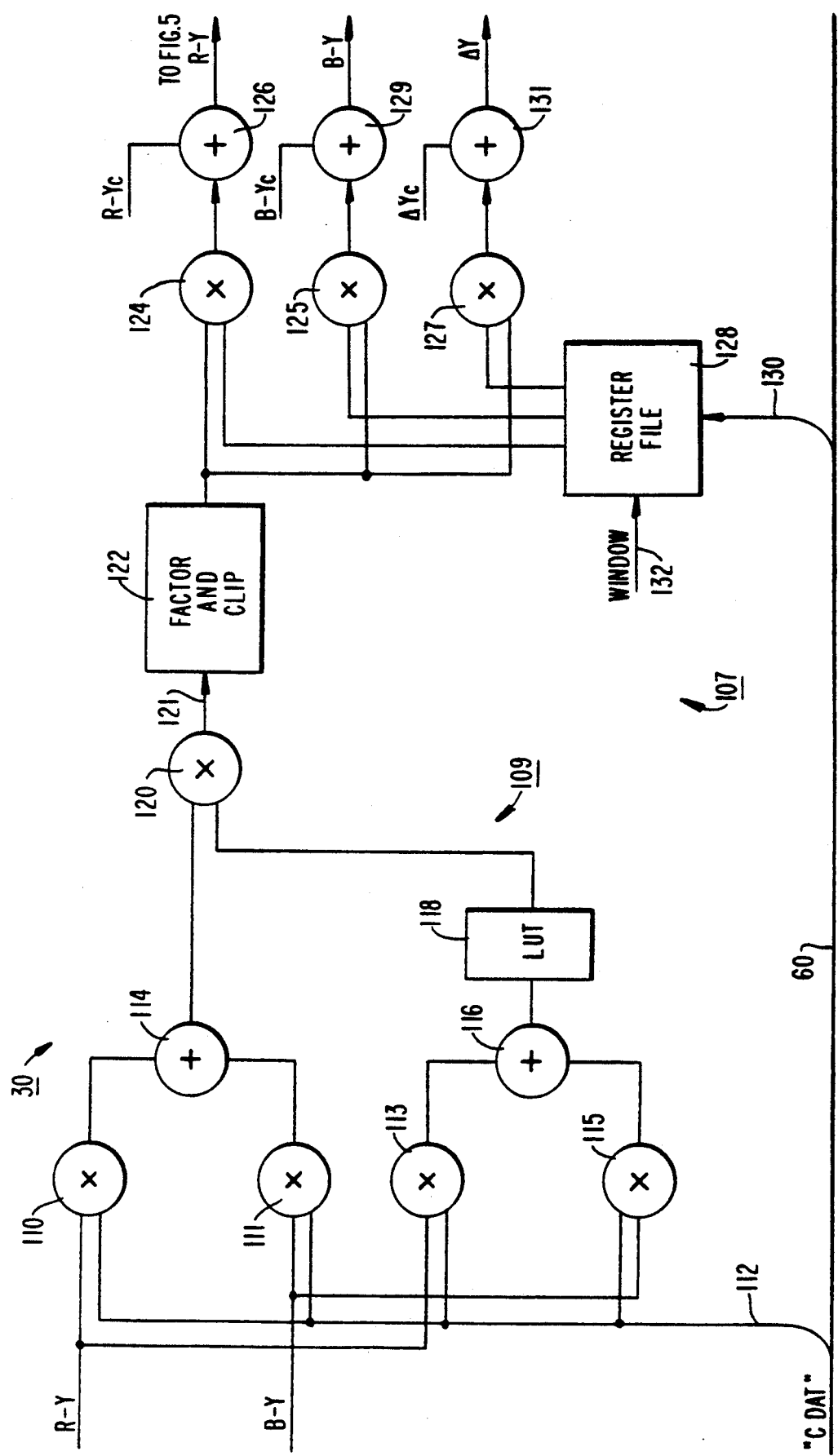
Figure 5:
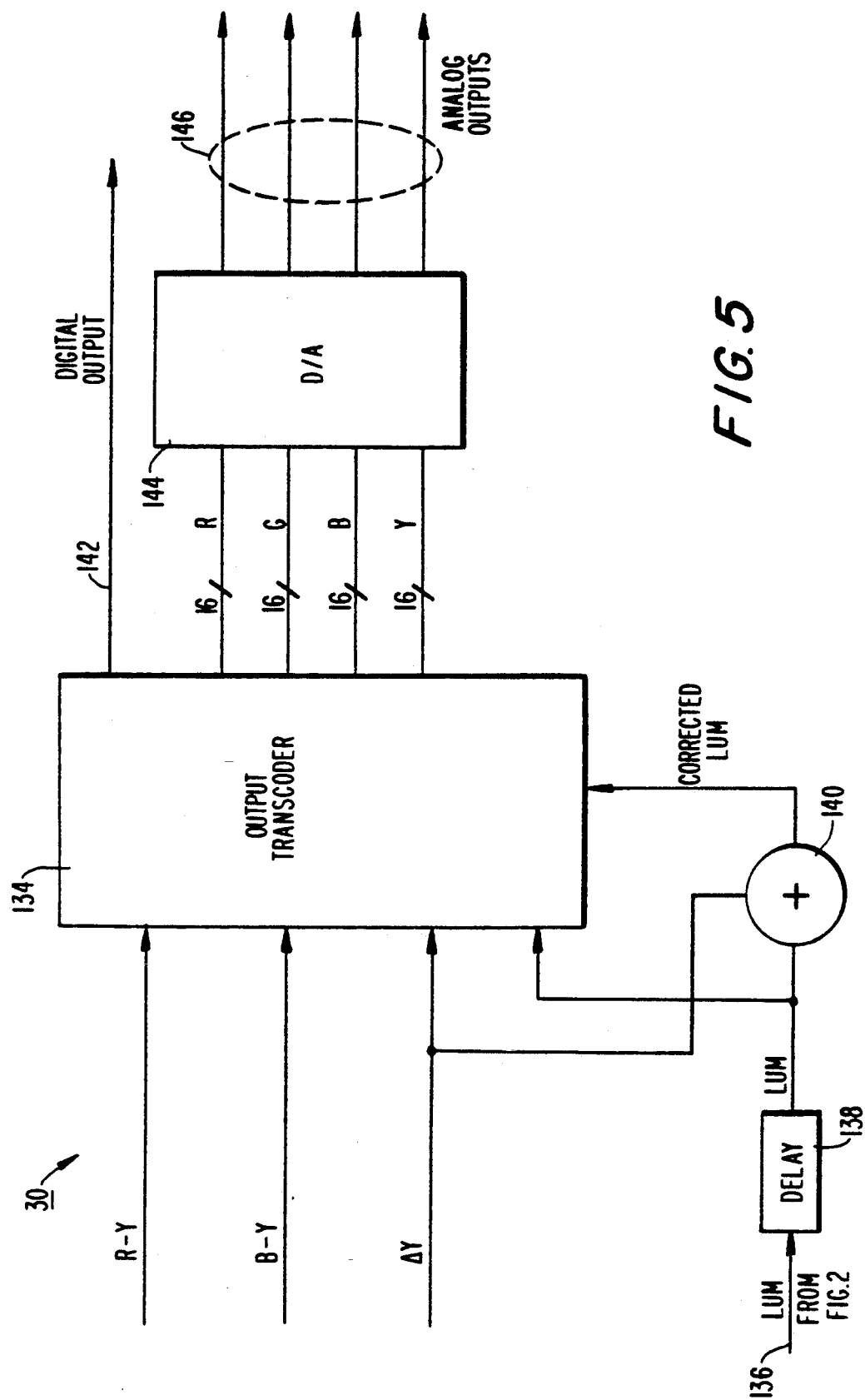
Figure 6:
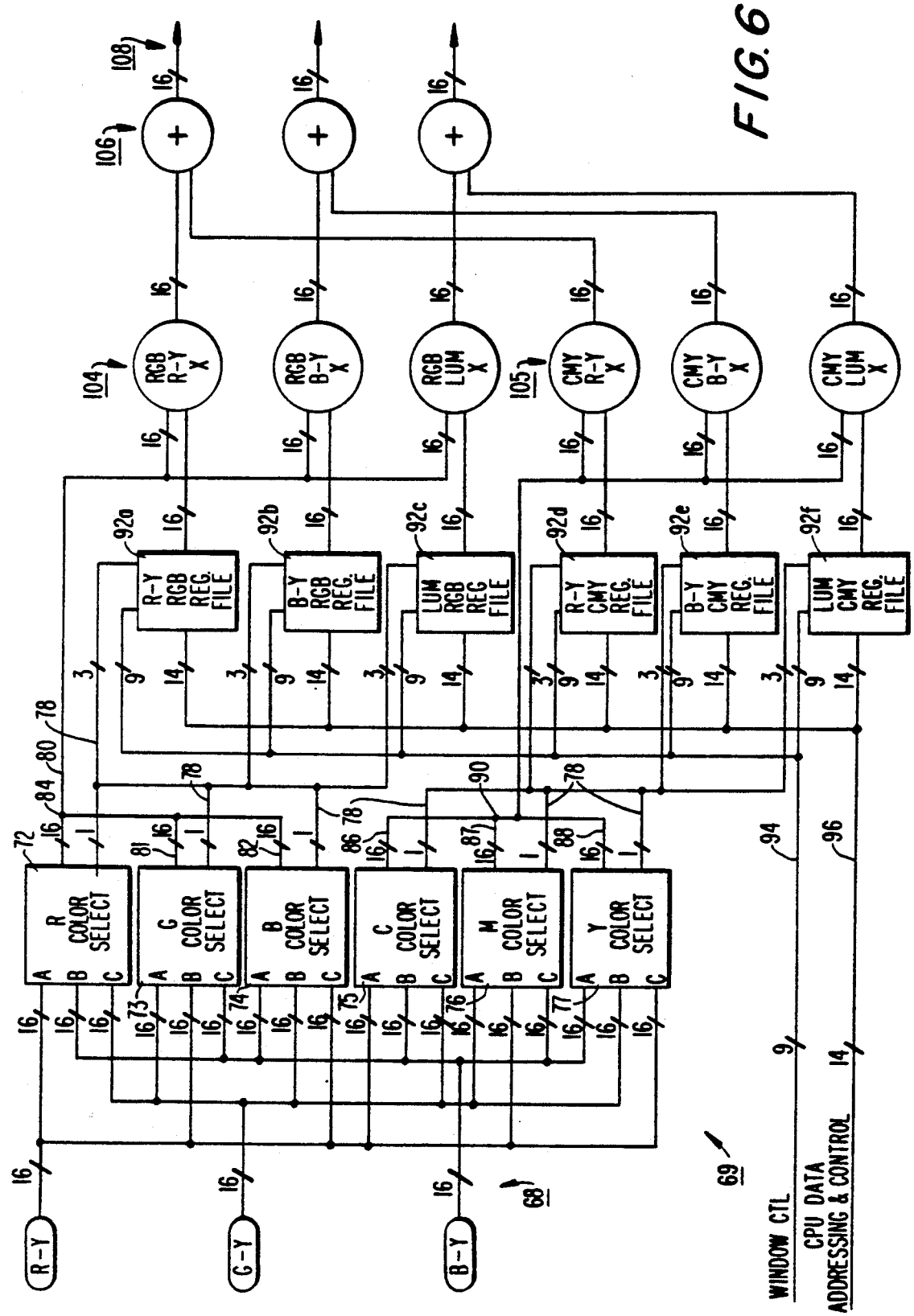
FIGS. 6 and 7 are schematic circuit diagrams of a portion of the circuit of the system of FIGS. 1-5.
Figure 7:
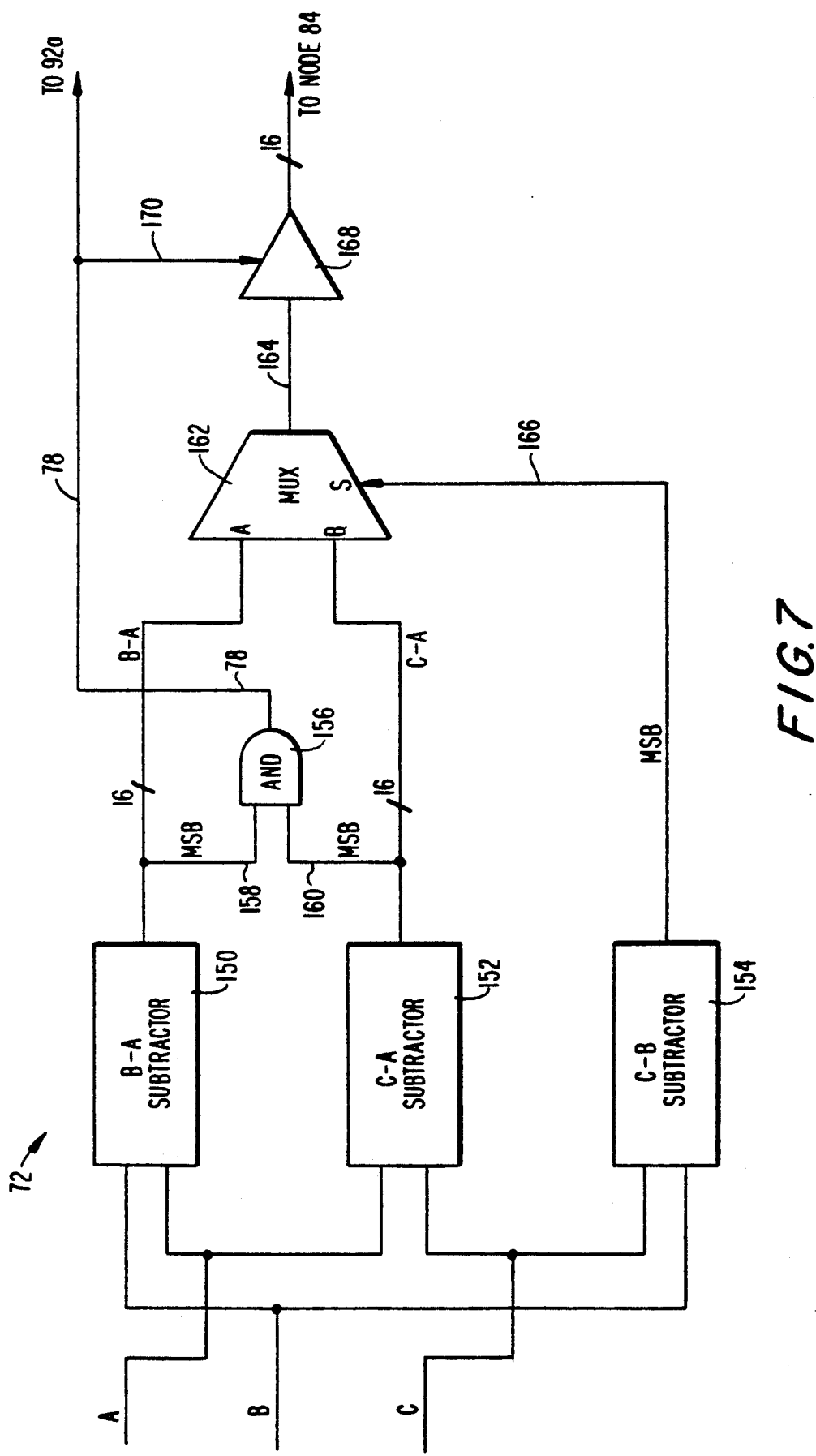

FIGS. 2 through 7 show the digital video processor 30 in some detail. The figures are drawn so that the output signals on the lines at the right of each of FIGS. 2, 3 and 4 are continued as input lines to the circuitry on the following sheet, with exceptions as noted on the sheets themselves. Therefore, to obtain a complete diagram, the four sheets, FIGS. 2, 3, 4 and 5 should be laid side by side, in numerical sequence. FIGS. 6 and 7 show a portion of the circuitry in greater detail.

Now referring to FIG. 2, the input lines 38 at the left are adapted to accept digital video signals, and lines 40 will accept analog video signals. Digital video inputs can be applied to each of the two lines A and B, and the machine selects the input to be processed.

Digital video signals on either line A or B pass through an input processor and digital matrix circuit 42, of known construction, which converts the signals into digital R,G,B, and Y signals; that is, red, green, blue and luminance signals. Those signals are delivered to an input selector circuit 48, which is a multiplexer which selects among the digital video inputs, analog video inputs, or test signals from a test signal generator 46, depending upon the form of the input signals to be corrected.

Analog input signals are converted to digital form by an analog-to-digital convertor 44. Once the signals are converted to digital form, the processing continues in the same way as for digital video input signals.

The multiplexer is controlled by signals received through a line 62 from a computer data bus 60 labelled "C DAT" from a microprocessor computer 54. The computer 54 receives serial data on an input line 56 from the control panel by way of the main data processor 28, or from the main data processor itself. The microprocessor is a 16-bit processor such as the NEC V40.

The microprocessor 54 operates with a set of tables 58 which take the form of EPROM's which store data and algorithms for use in converting shaft position changes of the control knobs, etc. into corrections for the various color parameters corrected by the system, as it will be explained in greater detail below.

The R,G,B, and Y signals output from the input select circuit 48 go to a color balance circuit 50. The color balance circuit 50 includes a red processor 51, a green processor 53, a blue processor 55, and a luminance processor 57. Each of these processors is known and will not be described herein. It is used to modify the gain, gamma and pedestal of each of the red, green, blue and luminance signals in accordance with the operation of the controls on the panel 16 (FIG. 1). The signals from those controls are sent through the microprocessor 54, the data bus 60 and the line 64 to the processors 51, 53, 55 and 57.

After being modified digitally in the color balance processors, the R,G,B, and Y signals are sent to a color level processor 52 which performs essentially the same functions as those set forth in U.S. Pat. No. 4,866,511.

Responsive to signals received over the line 66, the color level processor digitally modifies the overall color level of the signals.

Modification of colors in accordance with pre-determined curves is performed substantially as described in U.S. Pat. No. 4,866,511 for signals whose luminance is in the high range; or in the mid-range, or in the low range. The data establishing the curves is stored in look-up tables. In addition, the color level processor subtracts the luminance signal from each of the R,G and B signals and supplies the R-Y, G-Y and B-Y signals on the output lines 68 which go to FIG. 3. The luminance signal by-passes the circuitry of FIGS. 3 and 4 and goes directly to the circuit of FIG. 5.

COLOR DERIVATIVE CIRCUIT

FIG. 3 shows digital color derivative circuit 69. In that circuit, the R-Y, G-Y and B-Y inputs at 68 are delivered to a 6-Sector discrete sector hue detector 70. The detector 70 contains individual circuits 72, 73, 74, 75, 76 and 77, each of which is adapted to detect signals in a particular sector or band of the color spectrum; specifically in the red, green, blue, yellow, magenta or cyan sector, respectively.

Each of the circuits 72-74 produces an output signal on its output line 80, 81 or 82 when the data representing a pixel of the picture represents red, green or blue. It should be noted that the pixel can have only one of the three primary colors. Therefore, the output lines 80, 81 and 82 are connected together ("ORed") at a point, 84 to reduce the circuitry required.

Each pixel may have one of the three secondary colors yellow, magenta or cyan, but it cannot have more than one of the secondary colors. Therefore, the output lines 86, 87 and 88 of the three detector circuits 75, 76, and 77 are similarly connected together at a point 90.

Each circuit 72-77 has an output line 78 upon which a signal appears whenever it detects color. Each of these lines 78 is connected to a register files circuit 92 which has seven levels of output latching circuits. Each of the seven levels represents a different level of output magnitude.

Register files circuit 92 delivers signals over three output lines 100 to each of three multipliers 104, and each of three other output lines 102 delivers signals to one of three multipliers 105. The signals delivered on lines 100 and 102 are pre-determined functions of the sine and cosine of Θ, the phase angle of the detected color.

As it is disclosed in the Sunburst U.S. Pat. No. 4,862,251, by varying the sine and cosine of Θ, one can change the hue of the output digital signals to make hue corrections.

Similarly, saturation corrections are made by increasing the co-efficient of the sine and cosine functions.

The outputs of the ones of the circuits 72-77 which detect color then are directed, together with a signal on one of the lines 100, 102 to one of the multipliers 104, where the signals are digitally multiplied together to produce, respectively, R-Y', B-Y' and ΔY', R-Y$^c$, B-Y$^c$, and Δ Y$^c$ (the prime stands for "primary" and the "c" stands for complementary or secondary color).

The outputs of the multipliers 104 and 105 are connected as shown to three adding circuits 106. One of the adding circuits produces an output signal equal to R-Y$_c$. The second produces an output equal to B-Y$_c$, and the third adder produces a signal equal to Δ Y$_c$.

DEDICATED WINDOWS

A window circuit 98 is provided (see the lower left-hand corner of FIG. 3). This circuit, which contains conventional circuitry to move the window and enlarge and reduce its size, also contains circuitry, subject to operator control, to select the operation of a window to operate only on a selected one of the six primary and secondary colors. In other words, if red were the selected color for operation of the window, the circuit 98 will alter only red objects within the window. There is no restriction on which colors can be corrected outside the window. Therefore, separate corrections for each of the six colors can be made outside the window. Therefore, for example, the operator can correct the red color of a Coca-Cola can which is located inside the window, while simultaneously correcting the blue sky which is outside the window, and he can provide a separate and different corrections for objects outside of the window.

In accordance with another feature of the invention, a separate window can be formed for each of the six primary and secondary colors. Each can be moved and sized independently of the others and can be dedicated to a different color. This is done without added hardware by use of software.

These functions are enabled from the operator panels. Specifically, the operator can enable the function by the use of one or more keystrokes on a keypad, and the functions are performed by the software of the microprocessor.

In accordance with another feature of the invention, the programming of the microprocessor is such that during the scanning which is used to form a video picture on a screen, as the scan lines move from one side to the other of the band forming the frame around the window, the programming automatically steps through the register files 92 to step from one level to the next to gradually increase or decrease the co-efficients applied to the color correction circuits as one traverses from one edge to the other of the frame. This solves the difficult digital problem of providing a gradual change of the color correction from one edge to the other of the window frame to give the frame a "soft" transition.

In accordance with another feature of the present invention, where the window is specifically designated to affect one and only one hue, the area forming the window frame is given that hue so that operator will know that he has limited the operation of the window to that hue. In other words, if the window is dedicated to the corrections of only blue, the window frame will be blue.

OUTPUT CIRCUIT

The output signals of the color derivative circuit shown in FIG. 3 are located on terminals 108. Those signals go to the summing circuits 126, 129, and 131 at the right hand side of FIG. 4, where they are added to corrections from the FIG. 4 circuit and sent to terminals at the left-hand side of FIG. 5.

FIG. 5 shows that the R-Y, B-Y and Δ Y signals are sent to an output transcoder 134 which converts the input signals into digital output signals suitable for recording in a recorder, or for other uses. Alternatively, the signals are sent to a 16×4 digital-to-analog converter 144 which delivers analog output signals on the lines 146. These signals can be used to drive an analog monitor, or they can be used to record program material on video tape in analog form, etc.

It is to be noted that the luminance signal from FIG. 2 is input on line 136 to a delay circuit which introduces a certain amount of time delay to make up for the fact that the luminance signal has by-passed the processing circuitry of FIGS. 3 and 4 and has not been delayed by that circuitry. Therefore, the luminance signal is in synchronism with the other input signals to the FIG. 5 circuitry.

The microprocessor 54 also is synchronized so that it operates during the vertical interval of the video signals and does not interfere with them.

The output of the delay circuit 138 is delivered to a summing circuit 140 which adds the $\Delta Y$ and the delayed luminance signals together to provide a corrected luminance signal which is delivered to the output transcoder 134. Thus, the digital or analog output signals have fully corrected video parameters.

VARIABLE BAND COLOR CORRECTOR

FIG. 4 shows a color correction circuit 107 which operates in parallel with the circuit of FIG. 3.

The R-Y and B-Y output signals from the circuit of FIG. 2 are used as input signals to a color detector circuit 109 which operates to detect colors within a narrow region or band of the color spectrum. The band of the color spectrum in which the color is located is essentially infinitely variable by manipulation of the knob 21 (FIG. 1) in the control section 20 of the control panels. The hue or color detector 109 produces a digital signal at output point 121 which indicates that a signal has been detected that falls within the selected range or band of hues. The magnitude of the output signal represents the saturation of the signal.

The color detector 109 operates on principles substantially the same as those of the color detector in the Sunburst patent, except that there is no analog sign and cosine function generator as in the Sunburst patent, and the operation is entirely digital. The sine-cosine generator function, as has been noted above, has been assumed by the microprocessor 54 (FIG. 2) and its look-up table 58.

The R-Y and B-Y input signals are conducted as shown to one input of digital multiplier circuit 110, 111, 113 OR 115.

Those multiplier circuits receive sine and cosine function signals over the line 112 from the data bus 60, depending upon where the selector knob is set to select a given band of the spectrum, and where the band width or Delta function knob is set to determine the width of the band. The outputs of multiplier circuits 110 and 111 are summed in a summing circuit 114 whose output is supplied as one input to another digital multiplier circuit 120.

The outputs of multipliers 113 and 115 are summed together in a summing circuit 116. The output of that summing circuit is delivered to a look-up table 118 which provides digital output signals having values corresponding to those which would be produced by the multiplier circuits 236 and 242 in FIG. 8 of the Sunburst U.S. Pat. No. 4,862,251, that is, the output will be a funotion of $D(R-Y)\cos \Theta$ minus $D(B-Y)\sin \Theta$ (quantity squared), where $\Theta$ is the phase angle determining the hue, D is the factor determining the band width.

The output of the color detector at 121 is sent to a factor and clip circuit 122, which is a dual-threshold level detector which allows the operator to selectively discriminate against signals whose saturation is above or below one of a pair of adjustable levels.

The output of the factor and clip circuit 122 is delivered to each of the three multiplier circuits 124, 125 and 127. Another input to each of these multipliers comes from a register file circuit 128 substantially the same as the register file circuit 92 in FIG. 3. This circuit receives signals, over a line 130 from the bus 60 signals which provide suitable modification of sine and cosine of $\Theta$, and of the multiplier factor therefor to provide adjustments to the hue and the saturation and the luminance of the signals in accordance with the manipulation of those controls on the panel 20 in FIG. 1.

The outputs of the multipliers 124, 125 and 127 are delivered to summing circuits 126, 129 and 131, respectively where the outputs are added together with the outputs from terminals 108 in FIG. 3, and the sums are delivered to the input of the circuit in FIG. 5.

Preferably, the multipliers shown in the drawings are hardware multipliers, and are not formed in or by the microprocessor. The multipliers should be very fast (e.g., they should operate in around 15 nano seconds) and this speed is best provided by hardware.

DISCRETE SECTOR COLOR CORRECTOR DETAILS

FIGS. 6 and 7 show further details of the fixed sector color corrector 69 of FIG. 3.

FIG. 6 shows the scheme used to interconnect the R-Y, G-Y, and B-Y signals to cause each of the circuits 72-77 to detect the appropriate hue.

FIG. 6 also shows that the register files circuit 92 shown as a single block in FIG. 3 actually is better shown as a series of separate units 92a, 92b, 92c, 92d, 92e and 92f. Furthermore, the windows circuit 98 shown in FIG. 3 actually is not a separate circuit, but is contained within the register file circuits.

FIG. 7 is a schematic circuit diagram of one of the color detectors or selectors 72 shown in FIGS. 3 and 6. The input lines are labelled "A", "B" and "C" to indicate that the same circuit is used for each of the six color detector units 72-77, and that the one shown in FIG. 7 is merely an example. The inputs lines A, B and C will be connected to receive the R-Y, G-Y and B-Y signals appropriate under the circumstances, and as is shown in FIG. 6. The secondary color selector circuits 75, 76 and 77 receive inverted inputs $\overline{R-Y}$, $\overline{B-Y}$, and $\overline{G-Y}$, in the appropriate combination to select those secondary colors.

The circuit 72 includes three subtractor circuits 150, 152, and 154. Subtractor 150 subtracts the signals on line A from those on line B; subtractor 152 subtracts the signals on line A from those on line C; and subtractor 154 defines the difference between the signals on lines C and B. The outputs from subtractors 150 and 152 are delivered over lines 158 and 160 to separate inputs of an "AND" gate 156. The AND gate 156 detects only the most significant 16-bit signals coming out of the subtractors.

The subtractors are of the type that if the product of the subtraction is negative, the output of the subtractor circuit is true or high. Therefore, an output is produced on line 78 if and only if the outputs of both subtractors 150 and 152 is high, meaning that the signal on line A is larger than the signal on line B and the signal on line C.

The signal on line 78 is sent to the register file section 92a.

The output of subtractor 154 is used to send a select signal on line 166 to the select terminal of a multiplexer 162. Multiplexer 162 selects between one of two inputs on lines A and B to sent an output signal on line 164 to a tri-state gate 168. The output of the tri-state gate goes to the node 84 (see FIG. 3 and 6). The gate 168 is gated on by the signal which appears on line 78 which is transmitted through the line 170.

The output of the subtractor 154 is either high or low depending upon whether the signals on line B are greater than those on line C or vice versa. If the B signal is greater than the C signal, the B input of the multiplexer 160 is selected. If the B input is less than the C input, the input on line A will be selected by the multiplexer 162.

The output of the multiplexer which appears on line 164 represents the magnitude of the color signal which has been detected. Therefore, the output of the circuit 72 indicates that signals falling within a specified sector (e.g., the red sector) of the color circle have been detected, and the signal output from the gate 168 indicates the magnitude of those signals.

Of course, as with the rest of the color correction circuitry described herein, the operation is entirely digital, and the signal output from the gate 168 is a 16-bit digital signal.

It can be seen from the foregoing that the present invention meets the objectives set forth above. The color correction circuitry operates entirely digitally, even when either the input or output signals are in analog form. The circuitry is characterized by the fact that it requires fewer multipliers and hardware as compared with prior circuits which perform similar functions. The circuit is stable, reliable and essential noise-free. Moreover, the problems inherent in vectorially adding analog signals together are avoided.

A window control is provided with a versatility which has not been reached in the past, and thus provides a major improvement for analog as well as digital color correctors.

The above description of the invention is intended to be illustrative and not limiting. Various changes or modifications in the embodiments described may occur to those skilled in the art and these can be made without departing from the spirit or scope of the invention.

We claim:

1. A digital video color corrector comprising means for receiving digital video input signals representing pixels of a video picture, digital detecting means for detecting the color of each of said video signals and for producing corresponding digital color signals, and generating means for receiving said color signals and for generating digital output signals, said generating means including digital computer means, responsive to operator control signals, with look-up table means for storing values which are a function of the phase angle of the color detected, and for producing corresponding modification signals, and digital combining means for combining said color and modification signals to produce digital output signals whose hue and/or saturation is different from those characteristics of the corresponding input signals.

2. A digital video device as in claim 1, in which said look-up table means stores values proportional to the sine and cosine of said phase angle.

3. A device as in claim 1 in which said digital combining means comprises digital multiplier means for multiplying said color signals and said modification signals together to produce digital output signal whose hue and/or saturation and/or luminance is different from that of the corresponding input signals.

4. A device as in claim 1, including a digital record player source of said video input signals, control means for producing said control signals, said control means including a plurality of digital controls, selected from the group consisting of; color balance controls; hue controls; saturation controls; and luminance controls.

5. A digital color corrector for correcting the hue and/or the saturation of digital input video signals whose hues falls within one of a plurality of separate discrete regions of the color spectrum, said corrector comprising digital color detector means for detecting which of said regions a given digital input signal falls into, adjustment means for separately adjusting the parameters of the hue and/or the saturation and/or the luminance of signals whose hues fall within different ones of said regions, said color detector means comprising three primary detectors for detecting primary colors and three secondary detectors for detecting secondary colors and means for combining the output of one of said primary detectors with the output of one of said secondary detectors to produce two output signals which together define the hue of the detected video signals.

6. A device as in claim 5, including means for combining said output of said one secondary detector with said output of said primary detector to produce a new luminance signal.

7. A device as in claim 5, including storage means for storing values which are a function of the phase angle of the color detected, selecting among said values, and using said values in a digital multiplier to multiply the detected color signal by said function.

8. A device as in claim 5, in which said output signals are equal to R-Yc and B-Yc, respectively.

9. A digital color corrector for correcting the hue and/or the saturation of digital input video signals whose hue falls within one of a plurality of separate discrete regions of the color spectrum, said corrector comprising color detector means for detecting which of said regions a given digital input signal falls into, adjustment means for separately adjusting the hue and/or the saturation and/or the luminance parameters of signals whose hues fall within different ones of said regions, said adjustment means including register file means for storing signals representing a plurality of different digital signal levels, and means for selecting one of said signal levels, wherein said color corrector includes window forming means for forming a window of variable size and position on a video screen, means for permitting color corrections only either inside of or outside of said window, and means for selecting one of a plurality of different hues to which said window is to apply exclusively, the remaining ones of said hues being unaffected by said window.

10. A color corrector for correcting the hue and/or the saturation of input video signals whose hue falls within one of a plurality of separate discrete regions of the color spectrum, said corrector comprising color detector means for detecting which of said regions a given input signal falls into, adjustment means for separately adjusting the hue/ and/or the saturation and/or the luminance parameters of signals whose hues fall within different ones of said regions, wherein said color corrector includes window forming means for forming a window of variable size and position on a video screen, means for permitting color corrections only either inside of or outside of said window, means for selecting one of a plurality of different hues to which said window is to apply exclusively, the remaining ones of said hues being unaffected by said window, and means for forming a visible outline around said window, and giving said outline said one hue.

11. A device as in claim 10, in which said plurality of separate discrete regions define the three primary and three secondary colors of the color spectrum.

12. A digital color corrector, said digital color corrector comprising, in combination, means for detecting the hue of an input digital video signal when it falls within a relatively narrow band of the color spectrum, means for varying the position of said band in the color spectrum with essentially infinite variability, adjustment means for adjusting color parameters, digital computer means, said adjustment means including look-up table means for storing values which are a function of the phase angle of the hue detected, for converting adjustments of said color parameters into digital adjustment signals for adjusting the phase and/or amplitude of said video signal to adjust the hue and/or saturation thereof, and means for combining said adjustment signals with said input signals.

13. A device as in claim 12, including means for storing and retrieving signals corresponding to adjustment signals for each scene, means for retrieving stored adjustment signals and applying them to a later scene, and for using to retrieved signals, with modifications, to correct said later scene.

14. A device as in claim 12, said color corrector including window forming means for forming a window of variable size and position on a video screen, means for permitting color corrections only either inside of or outside of said window, and means for selecting one of a plurality of different hues to which said window is to apply exclusively, the remaining ones of said hues being unaffected by said window, said window forming means including register file means for storing signals representing a plurality of different signal levels, and mean for selecting one of said signal levels, and means for varying progressively the ones of said levels selected while forming a boundary for said window, so as to give said window a "soft" edge.

15. A device as in claim 12, in which said digital computer means includes said look-up table means for converting adjustments made by said adjustment means into signals which are a function on the sine and cosine of the phase angle of the detected color.

16. A device as in claim 12 including window forming means for forming a window of variable size and position on a video screen, means for selectively permitting color corrections inside and outside of said window, and means for selecting one of a plurality of different hues to which said window is to apply exclusively, the remaining ones of said hues being unaffected by said window.

17. A digital color detector circuit including a plurality of digital subtracting circuit means for subtracting various combinations of color component signals from one another, means for providing an output color detection indication when the magnitude of one of said signals exceeds the others, and means for delivering a digital output signal from one of said subtracting circuit means to indicate the magnitude of the color component signal detected.

18. A device as in claim 17 in which there are three of said subtracting circuit means, and an AND gate connected to receive the outputs from two of said subtracting circuit means to provide said color indication.

19. A device as in claim 18 including a multiplexer connected to select between the outputs of two of said subtracting circuit means, the remaining one of said subtracting circuit means providing a selecting output signal to said multiplexer, the output of said multiplexer comprising said digital output signal.

20. A device as in claim 17 including input terminals, each for receiving a different color component signal, each of said subtracting circuit means comprising a digital subtractor circuit connected to at least two of said input terminals to subtract one of said color component signals from the other.

21. A plurality of digital color detector circuits as in claim 20 forming a multi-vector fixed-sector color detector, there being one of said devices for detecting each of the three primary colors and the three secondary colors in the color spectrum.

22. A method of digitally color correcting digital video signals, said method comprising the steps of:
using a digital color detector for digitally detecting the color of a specific area of a video picture to be color corrected,
producing a digital color signal corresponding to the detected color,
providing storage means with stored signals corresponding to functions of the phase angle of the detected color,
selecting at least one of said stored signals to provide a selected hue correction signal, and
digitally combining said digital color signal with said selected hue correction signal to produce a hue-corrected video output signal.

23. A method as in claim 22 in which said stored signals are functions of the sine and cosine of said phase angle.

24. A method as in claim 22 in which said combining step comprises digitally multiplying said digital color signal with said selected hue correction signal, said stored signals including signals representing saturation and/or luminance coefficients, and including the step of selecting said saturation and/or luminance coefficients from said stored signals, and digitally multiplying said digital color signal by the selected coefficient to provide adjustments to the saturation and/or luminance values of the video signals forming said area of said video picture.

25. A method as in claim 22 including the further steps of storing said corrected signals for application to frames in a video sequence, recalling said corrected signals for later use, and recording said signals on a video record medium.

26. A method as in claim 22 including the steps of sequentially displaying frames in a video moving picture sequence, stopping said video sequence, performing corrections, re-starting the motion of said sequence, and recording the corrected picture sequence on a digital video recorder capable of starting and stopping during recording of a sequence, and starting and stopping said recorder in synchronism with the stopping and starting of said sequential display.

* * * * *